Patented May 15, 1945

2,375,773

UNITED STATES PATENT OFFICE 2,375,773

STABILIZATION OF PYRETHRUM PREPARATIONS

John Carl de Jonge, Grand Rapids, Mich.

No Drawing. Application July 20, 1940, Serial No. 346,547

8 Claims. (Cl. 167—24)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for governmental purposes without the payment to me of any royalty thereon.

An object of this invention is to stabilize the pyrethrins, the principal active constituents in ground pyrethrum flowers and pyrethrum extracts, when exposed to air and sunlight, thus prolonging their usefulness as an insecticide.

Another object is to enhance the toxicity of the pyrethrins to insects that are economically injurious to man, by the combination therewith of toxic salts.

Still another object is to impart fungicidal properties to the pyrethrins that are used for horticultural purposes, as the pyrethrins themselves do not possess fungicidal properties.

It is a well known fact that the pyrethrins (pyrethrin I — $C_{21}H_{28}O_3$ — and pyrethrin II — $C_{22}H_{28}O_5$ —) are readily decomposed when exposed to air and sunlight, thus rendering the compounds valueless as an insecticide in a relatively short time. It has been shown that the pure pyrethrins when exposed to air and sunlight are decomposed to the extent of 97% in three days (see Pyrethrum Flowers by C. B. Gnadinger, 2nd ed., 1936, page 169). The ground pyrethrum flowers and other horticultural preparations are somewhat more stable, but nevertheless are readily decomposed by air and sunlight, necessitating frequent applications in order to control insects.

My stabilized product eliminates the necessity of such frequent applications in controlling insects as the active principles are rendered more resistant to the destructive action of air and sunlight.

In accordance with the present invention, I incorporate a pyrethrum extract in starch which may include some fatty acid and then react the same with an alkali earth or heavy metal hydroxide, basic salt, carbonate, or a basic carbonate, thus protecting the pyrethrins as well as enhancing their toxicity and also imparting fungicidal properties to them.

The metallic hydroxides, basic metal salts, metal carbonates, or basic metal carbonates probably protect the pyrethrins by preventing oxidation and by blocking, absorbing or otherwise neutralizing the destructive rays of the sun on exposure.

The soluble alkali earth and heavy metal salts, such as magnesium, calcium, barium; manganese; copper, zinc, tin, lead; etc., which are precipitated as the hydroxide, basic salt, carbonate or basic carbonate when treated with sodium, potassium or ammonium hydroxides; or a soluble alkali carbonate or bicarbonate, such as sodium bicarbonate, may be employed. The hydroxide, basic salt, carbonate, or basic carbonate are precipitated upon the starch granule and combined with it to form a uniform product entirely suitable for horticultural purposes. The starch-pyrethrum preparations containing copper, zinc, or a mixture of the two possess greater fungicidal properties than most of the other possible metals. In the process of manufacturing the new product reactions take place which produce from the water-soluble impregnated starch and water-soluble metal salt a water insoluble product from which neither the starch nor the metal salt can be washed even by boiling, and in which the toxic principals are stabilized. The reaction product is thus quite different from any mere physical admixture of ingredients. A reaction between the metallic salts and the pyrethrins (carboxylic acids) is also believed to occur as it is otherwise difficult to account for the greater toxicity of some of the new compositions over the pyrethrins themselves.

The starch granule is considered by most investigators to be made up of two distinct components, an outer somewhat insoluble portion known as $\alpha$-amylose or amylopectin, and an inner more soluble component known as $\beta$-amylose. The ordinary cereal starches contain a small amount of fatty matter, which may be extracted with suitable solvents. The starch granules obtained from different sources vary in size; those prepared from sweet potatoes are relatively small and produce products of very fine texture. However, starches prepared from any other source such as from corn, wheat, white potatoes, rice, etc., are entirely satisfactory. When preparations are made from starches containing 2–3% fatty acids or fats a product is obtained that is not readily wet by water and requires a wetting agent in order to produce a water suspension. Fatty acids may be added to starches by treating the starch with a solution of a fatty acid dissolved in a volatile solvent, or by adding the fatty acid to the pyrethrum extract dissolved in a suitable volatile solvent in which both extract and acid are soluble, and then completely removing the solvent by evaporation. An insecticide and fungicide prepared from starch containing one or two per cent of fatty acids are more impervious to water and possess better adhesiveness to foliage than one that does not contain fatty acids, A preparation that is readily suspended in water is best prepared from a starch containing only a small amount of fatty acids or from one that has been extracted with a suitable solvent such as menthanol or cellosolve to remove the fatty matter. The starches in either case should be oven dried at 105° C. until nearly all of the moisture held by them has been removed, which in some cases may amount to as much as 18%. The extraction and drying of the starch renders the granule more permeable and capable of absorbing and holding the pyrethrum extracts.

The preferred method of manufacturing my new composition of matter will now be fully described, it being understood, however, that deviations in compositions and proportions of materials used may be made without departing from the spirit of the invention. The dried starch is incorporated in a solution of a pyrethrum extract dissolved in a suitable volatile solvent such as chloroform. Sufficient solvent is used for thorough mixing and incorporation of the extract. The solvent is then removed by evaporation under reduced pressure, not sufficient heat being used to cause any decomposition of the pyrethrins. Temperatures below 100° C. are preferred.

The dried starch-pyrethrum mixture is suspended in a solution of a salt or mixture of salts, whose hydroxide, basic salt, carbonate, or basic carbonate are precipitated when treated with dilute alkalies, carbonates, or bicarbonates such as sodium hydroxide, sodium carbonate or sodium bicarbonate. Ammonium hydroxide may be used in a few cases where more complete precipitation is obtained by its use, as in the case of metal lead salts. The dilute precipitating reagent is added slowly with vigorous agitation to prevent local accumulation of alkali as alkalies destroy the pyrethrins. Sufficient reagent is added to precipitate the metal but not to render the mixture alkaline. The final reaction mixture should be neutral to faintly acid for best results. After precipitation the reaction mixture is agitated for half an hour or longer to allow completion of the reaction, then filtered. Since the normally soluble starch and metal salts entering into the reaction product are rendered insoluble by the reaction, and the pyrethrins in the reaction product are relatively insoluble in water, the product should be thoroughly washed of all soluble salts, then dried at a moderate temperature but not sufficient to cause any decomposition of the pyrethrins. It is preferable to dry the product in a current of warm air. The dried product will then be a fine powder, of uniform texture, insoluble in water, and capable of being ground much finer if desired.

Tests have shown that the product prepared from copper or zinc salts is entirely safe to apply to foliage either as a dust or as a spray without producing injury. Inert materials such as talc, starch, the extracted ground pyrethrum flowers, bentonite, or other materials may be added to dilute the product. The product may be prepared containing varying amounts of pyrethrins and alkali earth or heavy metal salts, depending upon the nature of the product desired and the use to which it is to be put. The amount of alkali earth or heavy metal salts that may be chemically combined with the pyrethrum impregnated starch is not definitely known, but sufficient can be strongly combined in the product to stabilize the pyrethrins and to produce good fungicides. A copper preparation containing 28% metallic copper has been prepared.

Toxicity tests were made on samples exposed to air and bright sunlight, using the American cockroach (*Periplaneta americana*, L.) as the test insect. The samples were exposed in thin layers in shallow paper trays to the direct sun's rays for a few hours a day for several weeks during the month of August. Tests were occasionally made against the roach. The toxicity of a sample exposed for 100 hours was as great as the freshly prepared product, thus showing that the pyrethrins were protected from oxidation and the destructive sun's rays. The analysis of the sample exposed contained 6.6% copper and 0.8% pyrethrins, and the average time required to kill cockroaches was approximately three hours, while the time required for a sample of unexposed ground pyrethrum flowers containing the same amount of pyrethrins was approximately twenty hours. According to Gnadinger, the time required to kill cockroaches with pyrethrum powder may be as long as 24 to 48 hours, depending upon the vitality of the roach and dosage applied (see Pyrethrum Flowers by C. B. Gnadinger, 2nd ed. 1936, page 41.

The following illustrations are given to show the operation of this invention, it being understood, however, that the proportions and ingredients may be changed depending upon the nature of the final product desired, without departing from the spirit of the invention.

*Example 1.*—To produce 100 grams of an insecticide containing 2.5% pyrethrins and 15% metallic copper the following materials and weights are required:

| | Grams |
|---|---|
| Starch (extracted or containing fatty acids) | 65 |
| Coppersulphate ($CuSO_4.5H_2O$) | 59 |
| Oleoresins of pyrethrum (containing 25% pyrethrins) | 10 |
| Sodium hydroxide, approximately | 8 |

*Example 2.*—To produce 100 grams of an insecticide containing 1% pyrethrins and 15% metallic zinc the following materials and weights are required:

| | Grams |
|---|---|
| Starch (extracted or containing fatty acids) | 75 |
| Zinc chloride ($ZnCl_2$) | 35 |
| Sodium carbonate $Na_2CO_3$ approximately | 11 |
| Extract of pyrethrum (containing 20% pyrethrins) | 5 |

*Example 3.*—To produce 100 grams of an insecticide containing 1% pyrethrins, 5% copper, and 5% zinc the following materials and weights are required:

| | Grams |
|---|---|
| Starch (extracted or containing 1–2% fatty acids) | 80 |
| Zinc sulphate ($ZnSO_4$) | 14 |
| Copper chloride $CuCl_2.2H_2O$ | 14 |
| Pyrethrum extract (containing 20% pyrethrins) | 5 |
| Sodium hydroxide, approximately | 7 |

*Example 4.*—To produce 100 grams of an insecticide containing 15% lead and 1% pyrethrins the following materials and weights are required:

| | Grams |
|---|---|
| Starch (extracted or containing 1 to 2% fatty acids) | 75 |
| Lead nitrate $Pb(NO_3)_2$ | 24 |
| Pyrethrum extract (containing 20% pyrethrins) | 5 |
| Ammonium hydroxide—sufficient to render mixture nearly neutral but not alkaline. | |

*Example 5.*—To produce 100 grams of an insecticide containing 10% calcium and 1% pyrethrins the following materials and weights are required:

| | Grams |
|---|---|
| Starch (extracted or containing 1 to 2% fatty acids) | 75 |
| Calcium chloride $CaCl_2$ | 12 |
| Extract of pyrethrum (containing 20% pyrethrins) | 5 |
| Sodium bicarbonate $NaHCO_3$ approximately | 10 |

Insecticides containing the other alkali earth metal salts may also be produced in a similar manner.

The precipitating reagent cannot be accurately calculated in most cases, as complex hydroxides, basic salts and carbonates are precipitated. Enough of the dilute alkali, alkali carbonate or bicarbonate is used to precipitate the metal but not enough to render the product alkaline. It is preferable to have the final reaction mixture neutral to slightly acid at the end.

Having fully disclosed my invention I claim:

1. The process of manufacturing a stabilized product of the class described, which consists essentially in impregnating starch with a solution of a pyrethrum extract dissolved in a volatile solvent; removing the solvent by evaporation; suspending the resulting toxic-impregnated starch composition in a solution of at least one of the soluble salts of the group consisting of copper-, zinc-, tin-, lead-, manganese-, and alkali earth metal-salts, the metals of which are precipitated by a reagent from the group consisting of dilute alkalis, carbonates, and bicarbonates; gradually adding such reagent to the suspension-containing solution and agitating the same until substantially complete reaction has occurred, whereby the metals of the salts become insoluble constituents in the composition, the impregnated starch becomes insolubilized, and the pyrethrum becomes stabilized; and separating the so stabilized insolubilized product.

2. A process according to claim 1 characterized in that 1 to 2% of fatty acids is dissolved with the pyrethrum in the volatile solvent before the starch is impregnated with said solution.

3. A process of producing an insolubilized stabilized pyrethrum-starch composition, which consists in forming a suspension of pyrethrum-impregnated starch in an aqueous solution of at least one of the soluble salts of the group consisting of copper-, zinc-, tin-, lead-, manganese-, and alkali earth metal-salts, the metals of which are precipitated by a reagent from the group consisting of dilute alkalis, carbonates, and bicarbonates; gradually adding such reagent to the suspension-containing solution and agitating the same until substantially complete reaction has occurred, whereby the metals of the salts become insoluble constituents in the composition, the impregnated starch becomes insolubilized, and the pyrethrum becomes stabilized; and separating the so stabilized insolubilized product.

4. A composition of the class described, consisting essentially of a pyrethrum-starch-metal salt product in which the pyrethrum is stabilized and the starch and metal salt insolubilized, said product being the product formed by the process of claim 3.

5. A process of producing an insolubilized stabilized pyrethrum-starch-copper insecticide and fungicide, which consists in forming a suspension of pyrethrum-impregnated starch in an aqueous solution of a soluble copper salt the metal of which is precipitated by a reagent from the group consisting of dilute alkalis, carbonates, and bicarbonates; gradually adding such reagent to the suspension-containing solution and agitating the same until substantially complete reaction has occurred, whereby the copper of the salt becomes an insoluble constituent of the composition, the impregnated starch becomes insolubilized, and the pyrethrum becomes stabilized; and separating the so stabilized insolubilized product.

6. A pyrethrum-starch-copper insecticide and fungicide in which the pyrethrum is stabilized and the starch and copper insolubilized, said product being the product formed by the process of claim 5.

7. A process of producing an insolubilized stabilized pyrethrum-starch-zinc insecticide and fungicide, which consists in forming a suspension of pyrethrum-impregnated starch in an aqueous solution of a soluble zinc salt the metal of which is precipitated by a reagent from the group consisting of dilute alkalis, carbonates, and bicarbonates; gradually adding such reagent to the suspension-containing solution and agitating the same until substantially complete reaction has occurred, whereby the zinc of the salt becomes an insoluble constituent of the composition, the impregnated starch becomes insolubilized, and the pyrethrum becomes stabilized; and separating the so stabilized insolubilized product.

8. A pyrethrum-starch-zinc insecticide and fungicide in which the pyrethrum is stabilized and the starch and zinc insolubilized, said product being the product formed by the process of claim 7.

J. CARL DE JONGE.